US010991279B1

(12) United States Patent
Vande Waerdt

(10) Patent No.: US 10,991,279 B1

(45) Date of Patent: Apr. 27, 2021

(54) MOBILE ELEVATING APPARATUS

(71) Applicant: KOOIMA COMPANY, Rock Valley, IA (US)

(72) Inventor: Nicholas Vande Waerdt, Rock Valley, IA (US)

(73) Assignee: Kooima Ag, Inc., Rock Valley, IA (US)

( * ) Notice: Subject to any disclaimer, the term of this patent is extended or adjusted under 35 U.S.C. 154(b) by 65 days.

(21) Appl. No.: 15/863,517

(22) Filed: Jan. 5, 2018

Related U.S. Application Data

(63) Continuation-in-part of application No. 15/480,477, filed on Apr. 6, 2017, now Pat. No. 10,467,932.

(51) Int. Cl.

| | |
|---|---|
| ***G09F 21/04*** | (2006.01) |
| ***F16M 11/42*** | (2006.01) |
| ***F16M 11/38*** | (2006.01) |
| ***G09F 7/20*** | (2006.01) |
| ***G09F 13/00*** | (2006.01) |
| ***G09F 7/22*** | (2006.01) |
| ***F16M 11/08*** | (2006.01) |
| *G09F 7/18* | (2006.01) |

(52) U.S. Cl.
CPC ............. *G09F 21/04* (2013.01); *F16M 11/08* (2013.01); *F16M 11/38* (2013.01); *F16M 11/42* (2013.01); *G09F 7/20* (2013.01); *G09F 7/22* (2013.01); *G09F 13/00* (2013.01); *G09F 2007/1865* (2013.01)

(58) Field of Classification Search
CPC ....... B61K 13/04; G09F 21/04; G09F 21/048; G09F 7/20; B60Q 1/50
See application file for complete search history.

(56) References Cited

U.S. PATENT DOCUMENTS

| | | | | | |
|---|---|---|---|---|---|
| 862,904 | A * | 8/1907 | Harrison | G09F 19/08 | 40/411 |
| 3,622,980 | A * | 11/1971 | Elledge, Jr. | G08G 1/096716 | 315/323 |
| 3,702,033 | A * | 11/1972 | Coleman | G09F 21/04 | 280/415.1 |
| D243,235 | S * | 2/1977 | Buxbom | D12/96 | |
| 4,087,785 | A * | 5/1978 | Dodich | B60Q 1/305 | 254/387 |
| 4,110,792 | A * | 8/1978 | Long | G09F 13/28 | 345/55 |
| 4,484,663 | A | 11/1984 | Wyse | | |

(Continued)

*Primary Examiner* — Cassandra Davis
(74) *Attorney, Agent, or Firm* — Jeffrey A. Proehl; Woods, Fuller, Shultz & Smith, PC

(57) ABSTRACT

A mobile elevating apparatus may include a mobile base having a front and a rear with a longitudinal axis being defined between the front and rear, with the mobile base comprising a frame and a wheel assembly mounted on the frame to support the frame in a manner permitting mobility. The apparatus may also include a lift assembly including at least one tier and being mounted on the frame and being extendable and retractable with respect to the frame to raise and lower a top of the lift assembly, an object mounted on the top of the lift assembly such that extension and retraction of the lift assembly raises and lowers the object, a power source positioned on the mobile base; and a control assembly mounted on the mobile base. In embodiments, the object may comprise a display sign.

22 Claims, 16 Drawing Sheets

(56) References Cited

U.S. PATENT DOCUMENTS 4,488,326 A 12/1984 Cherry
4,495,719 A * 1/1985 Futatsuishi ............ G09F 21/04 40/590
4,890,692 A 1/1990 Oakman
5,099,748 A 3/1992 Neubauer
5,121,816 A 6/1992 Curtin
5,669,517 A 9/1997 Donaldson
5,683,063 A 11/1997 Seiders
5,694,864 A 12/1997 Langewellpott
5,740,887 A 4/1998 Unger
5,755,306 A 5/1998 Kraemer
5,791,077 A * 8/1998 Felber .................... G09F 21/04 40/592
5,890,559 A 4/1999 Busuttil
5,890,737 A 4/1999 Hutka
6,065,565 A 5/2000 Puszkiewicz
6,095,286 A 8/2000 Citron
6,173,810 B1 1/2001 Citron
6,276,489 B1 8/2001 Busuttil
6,286,812 B1 9/2001 Cherry
6,371,243 B1 4/2002 Donaldson
6,405,114 B1 6/2002 Priestley
6,425,459 B1 7/2002 Keefer
6,517,225 B1 2/2003 Allen
6,561,546 B2 5/2003 Puszkiewicz
6,571,913 B2 6/2003 Puszkiewicz
6,607,285 B2 8/2003 Citron
6,750,829 B2 * 6/2004 Luoma ................... G06F 3/147 345/1.1
6,972,689 B1 * 12/2005 Morgan ................. G09F 21/04 340/815.4
RE39,477 E 1/2007 Plate
7,281,736 B2 10/2007 Sannah
7,493,987 B2 2/2009 Puszkiewicz
7,543,671 B2 6/2009 Donaldson
7,549,667 B2 6/2009 Busuttil
7,600,959 B2 10/2009 Neubauer
8,056,674 B2 11/2011 Bean
8,122,628 B2 * 2/2012 Johnson, Jr. .......... G06Q 30/02 348/834
8,631,902 B2 1/2014 Crook
8,678,135 B2 3/2014 Crook
9,108,831 B2 8/2015 Beji
9,174,488 B2 11/2015 Berry
9,238,573 B2 1/2016 Luminet
2007/0125581 A1 6/2007 Busuttil
2008/0105498 A1 5/2008 Perkins
2010/0294592 A1 11/2010 Crook
2011/0168490 A1 7/2011 Donaldson
2012/0043159 A1 2/2012 Clark
2012/0211301 A1 8/2012 Clark
2016/0146397 A1 * 5/2016 Kaytes ................... B65F 1/122 248/558

* cited by examiner

MOBILE ELEVATING APPARATUS

REFERENCE TO RELATED APPLICATIONS

This application is a continuation in part of U.S. Non-Provisional patent application Ser. No. 15/480,477, filed Apr. 6, 2017, the disclosure of which is hereby incorporated by reference in its entirety.

BACKGROUND

Field

The present disclosure relates to display sign systems and more particularly pertains to a new mobile elevating apparatus for providing, for example, a portable signage capability.

SUMMARY

In one aspect, the present disclosure relates to a mobile elevating apparatus comprising a mobile base having a front and a rear with a longitudinal axis being defined between the front and rear, with the mobile base comprising a frame and a wheel assembly mounted on the frame to support the frame in a manner permitting mobility. The apparatus may also comprise a lift assembly mounted on the frame and being extendable and retractable with respect to the frame to raise and lower a top of the lift assembly, with the lift assembly including at least one tier. The apparatus may further comprise an object mounted on the top of the lift assembly such that extension and retraction of the lift assembly raises and lowers the object, a power source positioned on the mobile base, and a control assembly mounted on the mobile base.

In some embodiments, the object may comprise a display sign, with the display sign having opposite display faces with at least one of the display faces including an illuminated changeable display.

In other aspects, the present disclosure relates to a method of communicating information over an area of land with a mobile display apparatus. The method may include providing a mobile display apparatus including a mobile base and a display sign mounted on the mobile base, providing at least one item at a location on the area of land, positioning the mobile display apparatus on the area of land adjacent to the location of the at least one item, deploying the mobile display apparatus, and displaying on the mobile display apparatus information related to the at least one item.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, and the particulars of the steps of operation, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
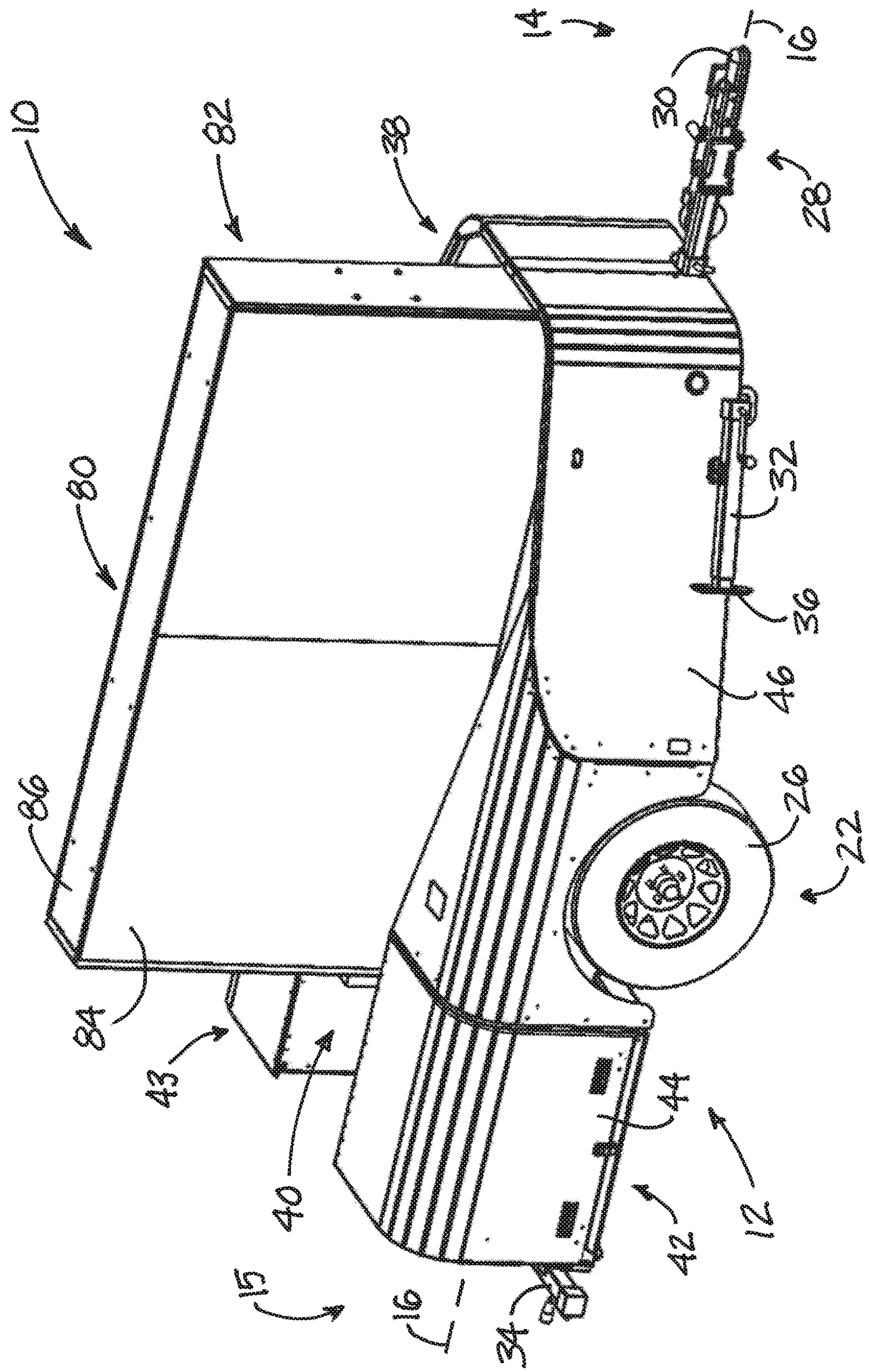
FIG. 1 is a schematic perspective side view of a new mobile elevating apparatus according to the present disclosure, showing the lift assembly in the retracted position.

With reference now to the drawings, and in particular to FIGS. 1 through 16 thereof, a new mobile elevating apparatus embodying the principles and concepts of the disclosed subject matter will be described.

In one aspect, the disclosure relates to a mobile elevating apparatus 10 suitable for transporting and elevating various objects for which a raised position may be desirable, such as, for example, a sign or platform but not limited to these illustrative applications.

The apparatus 10 may include a mobile base 12 which has a front 14 and a rear 15, with a longitudinal axis 16 that is defined between the front and rear and that defines a longitudinal direction for the mobile base. The mobile base 12 may include a frame 20 for supporting many of the elements of the apparatus in a condition raised above the ground surface which permits movement of the apparatus over the ground surface and preferably along roads and highways. A wheel assembly 22 may be mounted on the frame to at least partially support the frame above the ground surface and to permit the frame to travel over the ground surface. The wheel assembly 22 may include an axle 24 mounted on the frame, optionally via a suspension structure, and a pair of wheels 26, 27 may be mounted on the ends of the axle.

The mobile base 12 may also include a tongue assembly 28 which is mounted on the frame 20. The tongue assembly may include a hitch 30 for hitching to a towing vehicle to tow the mobile base over a ground or road surface. The tongue assembly 28 may extend forwardly from the frame 20 and may extend to the front 14 of the mobile base where the hitch 30 may be located. A portion of the tongue assembly 28 may be removably mounted on the frame 20 to permit removal of the portion from the frame when towing of the mobile base 12 is not required in order to enhance, for example, the security of the apparatus by making it difficult if not impossible to tow away the apparatus without the removable portion of the tongue assembly, and to also beneficially provide a smaller footprint for the apparatus when positioned in place for use. Optionally, a portion of the tongue assembly may be pivotally mounted on the frame to permit the portion to be pivoted to the side in a substantially horizontal plane.

The mobile base 12 may also include a set of outrigger legs 32, 33, 34, 35 which are mounted on the frame for providing greater stability of the apparatus when the mobile base is stationary for use. Each of the outrigger legs may have a lower pad 36 for contacting the ground surface. The lower pad 36 may be extendable downwardly and retractable upwardly with respect to the mobile base. The set of outrigger legs may include a pair of front outrigger legs 32, 33 which are positioned toward the front 14 of the mobile base and a pair of rear outrigger legs 34, 35 which are positioned toward the rear 15 of the mobile base. The pair of front outrigger legs may have portions which are laterally extendable with respect to the frame to adjust a position of the lower pad 30 of each of the front outrigger legs in a lateral horizontal direction to thereby broaden the base of contact with the ground with respect to the frame 20 while minimizing the travel width of the mobile base.

The mobile base 12 may also include a body 38 which is mounted on the frame 20 and may define a bay 40. The body 38 may cover a portion of the frame 20 and may define at least one compartment 42, and in some embodiments may define a pair of compartments 42, 43, with each of the compartments being positioned laterally of the bay 40. Each of the compartments may have a cover 44 and the cover may be pivotally mounted on the remainder of the body to permit pivot opening and closing of the cover to access the interior of the compartment. The body 38 may also include a forward fairing portion 46 which may taper narrower in width toward the front 14 of the mobile base and taper wider toward the rear 15 of the mobile base.

The apparatus 10 may also include a lift assembly 50 which is mounted on the frame 20 and is extendable and retractable generally in a vertical direction with respect to the frame to raise and lower a top 52 of the lift assembly. The lift assembly 50 may include at least one tier 54, and in some embodiments includes a plurality of tiers 54, 56. The plurality of tiers may include a lowermost tier 54 and a second tier 55 which is located above the lowermost tier.

Each tier of the lift assembly 50 may include a bifurcated beam 58 which may define a gap 60 between a pair of beam portions 62, 63 which form the bifurcated beam. The beam portion 62, 63 may be spaced from each other and may be oriented substantially parallel to each other. Each bifurcated beam 58 may have an upper end 64 and a lower end 65. A joint 66 may join together in a pivotal manner the upper end of one of the beam portions of a relatively lower tier to the lower end of a beam portion in a relatively higher tier. each tier of the lift assembly may also include a single beam 68 having an upper end 70 and a lower end 71. The single beam 68 may extend through the gap 60 of the bifurcated beam and the single beam may be pivotally mounted on the bifurcated beam at a pivot 72 which is generally located medially between the upper 70 and lower 71 ends of the single beam and is also located medially between the upper 64 and lower 65 ends of the bifurcated beam.

The lower end 71 of the single beam in the lowermost tier 54 of the lift assembly 50 may be mounted on the frame 20 in a manner permitting translation of the lower end of the single beam with respect to the frame. In some embodiments, the lower end 71 of the single beam may be mounted on a track 74 to permit translation movement of the end 71 with respect to the frame along the track. The track 74 may extend in a longitudinal direction of the mobile base.

The lift assembly 50 may also include a lift actuator 76 which is configured to extend and retract the tier or tiers of the lift assembly with respect to the frame. The lift actuator 76 may be configured to pivot the bifurcated beams and single beams with respect to each other, and may act upon the lowermost tier. In some embodiments, the lift actuator may be extendable and retractable and may have a lower end mounted on the frame 20 and an upper end mounted on, for example, the single beam 68. The lift actuator may be at least partially located in the gap defined by the bifurcated beam to minimize the footprint of the lift assembly. Illustratively, the lift actuator 76 may comprise a hydraulic piston and cylinder actuator which utilizes a hydraulic pressure on at least one side of the piston to produce extension and retraction. In some embodiments, the actuator may be double-acting, while in other embodiments the actuator may be single-acting and rely upon the weight of the lift assembly to cause retraction of the actuator.

An object 80 may be mounted on the top of the lift assembly 50 such that extension and retraction of the lift assembly raises and lowers the object. In some embodiments, the object 80 may comprise a display sign 82. The display sign may be elongated in the longitudinal direction 16 of the mobile base and may have opposite display faces 84, 85 which may face laterally with respect to the mobile base. In some embodiments, the sign 82 may be rotatable about a substantially vertical axis with respect to the lift assembly 50 and the frame 20 such that the display faces 84, 85 face forward forwardly and rearwardly rather than laterally. The rotation of the sign may be performed manually or through powered means. The display sign 82 may have a perimeter edge 86 which extends between the display faces 84, 85. At least one, and optionally both, of the display faces may include an illuminated changeable display capable of displaying characters, graphics, etc., and may include, for example, light-emitting diode elements to produce the display although other display technologies may be employed for the display sign. The changeable display elements of each display face may be independently operable so that the sign may have a mode in which both of the faces are actively displaying and another mode in which only one of the faces is actively displaying. Also, the display elements of the two display faces may display the same content or may display different content at the same time. Optionally only one of the display faces may have a changeable display while the other display does not have the changeable display.

In other embodiments of the apparatus, the object 80 may comprise a platform which may have an upper surface for supporting a person and/or cargo to vertically transport the person or cargo between a lower vertical level and a higher vertical level.

In some embodiments, the joint 66 between the ends of bifurcated beams of vertically adjacent tiers may comprise a pair of spaced walls 90, 91 of the lower end 65 of one of the beam portions 62, 63. Each of the spaced walls 90, 91 may have an aperture 92 formed in axial alignment with a corresponding aperture formed in the other spaced wall. The joint may further include a sleeve 94 which is mounted on the upper end 64 of the beam portion of another bifurcated beam, and a bore 96 may extend through the sleeve 94. A pin 98 may extend through the apertures 92 of the spaced walls 90, 91 as well as through the bore 96 of the sleeve 94. A bearing 100 may be positioned between the pin 98 and the sleeve 94.

The joint 66 may also include a retainer device 102 which is configured to retain the pin 98 in position on the spaced walls 90, 91 and the sleeve 94. The retainer device 102 may be configured to resist rotation of the pin with respect to the spaced walls 90, 91 while permitting rotation of the pin with respect to the sleeve 94, as well as the bearing 100 positioned between the pin and the sleeve. The retainer device 102 may include a retainer bracket 104 which may have a retainer aperture 106 formed therein. The retainer aperture 106 may receive an end portion 108 of the pin. The shape of the retainer aperture and the shape of the end portion of the pin may be complementary to interlock to resist rotation of the pin with respect to the retainer bracket when the end portion is inserted into the retainer aperture. Illustratively, the end portion of the pin may have at least one flat surface 110 and the retainer aperture 106 of the retainer bracket may have at least one flat surface 112 which is configured to engage the flat surface of the end portion of the pin. In some embodiments, a pair of the flat surfaces may be formed on the end portion of the pin and the retainer aperture may have a pair of flat surfaces in complementary positions, and usually in opposing positions. The retainer bracket 104 may have a tab portion 114 which is inserted into a hole 116 formed in one of the spaced walls 90, 91 to resist rotation of the retainer bracket with respect to the spaced wall. Optionally, a pair of the retainer brackets may be utilized for a beam portion with the bracket being located on either side of the same pin which may also help resist the spaced walls from spreading away from each other.

Figure 9:
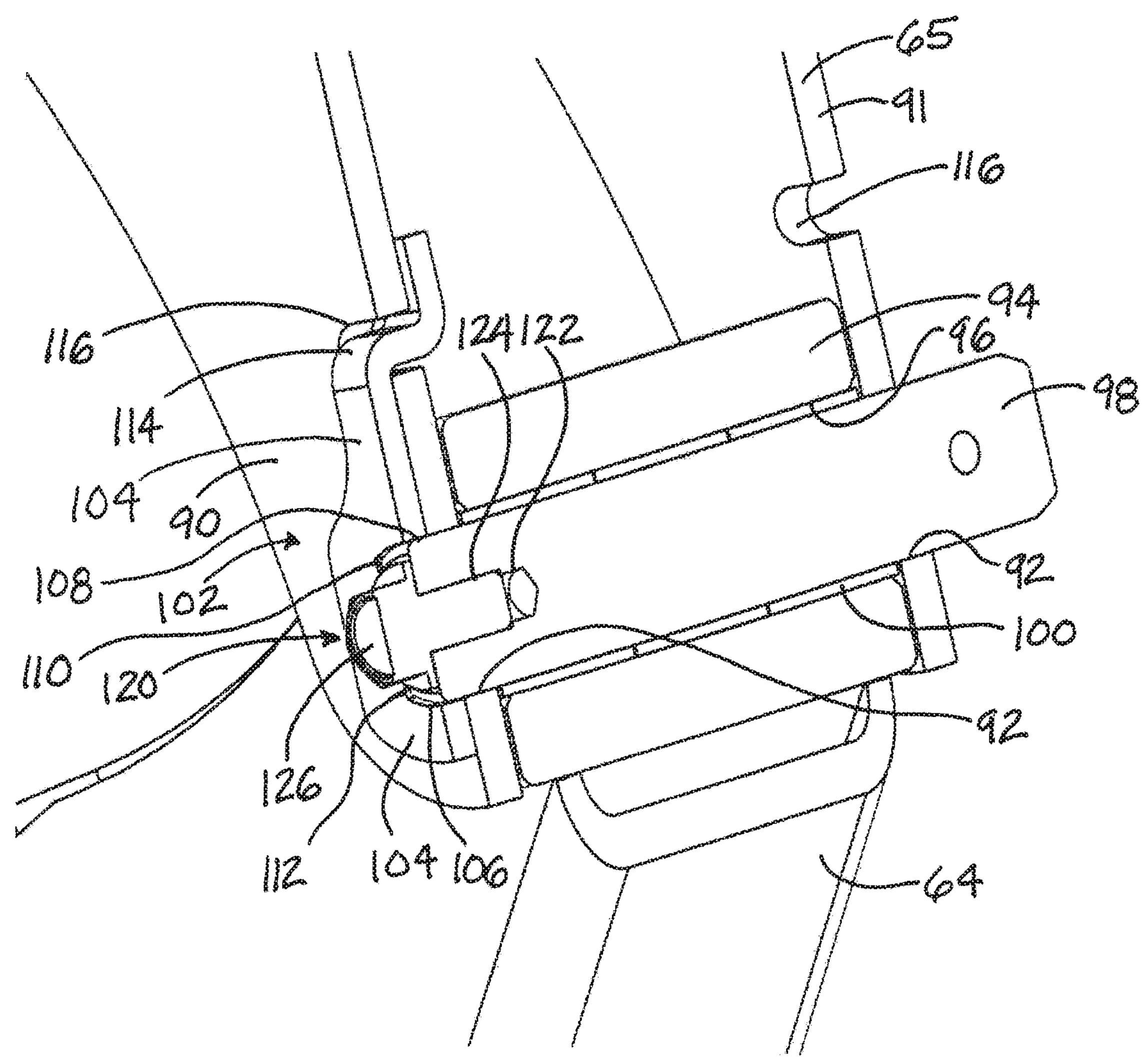
FIG. 9 is a schematic perspective view of one configuration of the joint of the lift assembly with portions broken away to reveal detail, according to an illustrative embodiment.

The retainer device 102 may also include structure for retaining the retainer bracket on the pin in a removable manner. In some embodiments, such as shown in FIG. 9, the retaining structure includes a retainer fastener 120 which is threaded into a threaded bore 122 on the end portion 108 of the pin. A portion of the retainer fastener 120 may extend beyond the end portion of the pin to resist removal of the retainer bracket from the end portion 108 without requiring removal of the retainer fastener. The retainer fastener may have a threaded shaft portion 124 which is at least partially inserted into the threaded bore 122 on the end portion of the pin and a head portion 126 which overlaps a portion of the retainer bracket.

Figure 10:
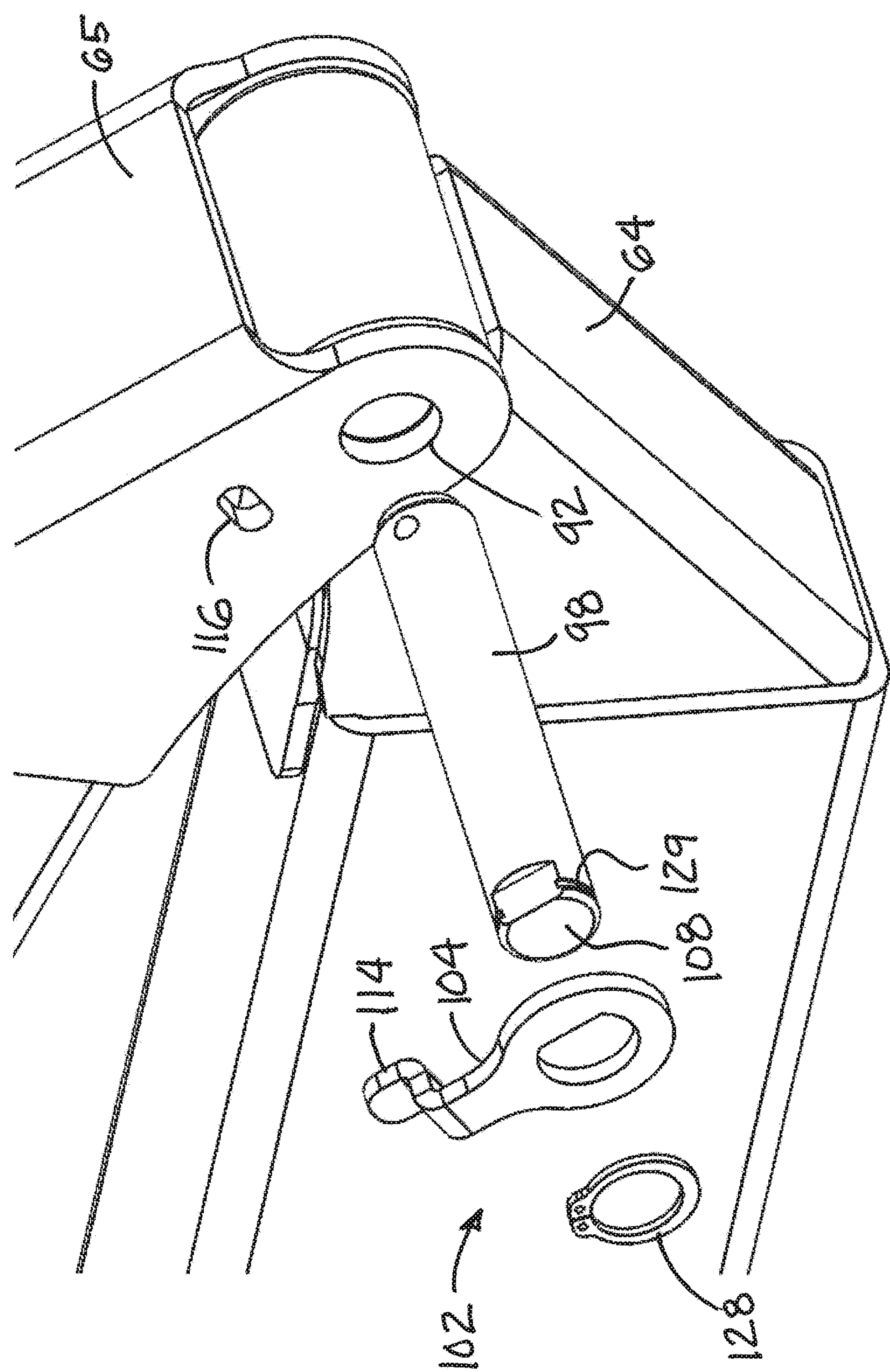
FIG. 10 is a schematic exploded perspective view of another configuration of the joint of the lift assembly with portions broken away to reveal detail, according to an illustrative embodiment.
Figure 11:
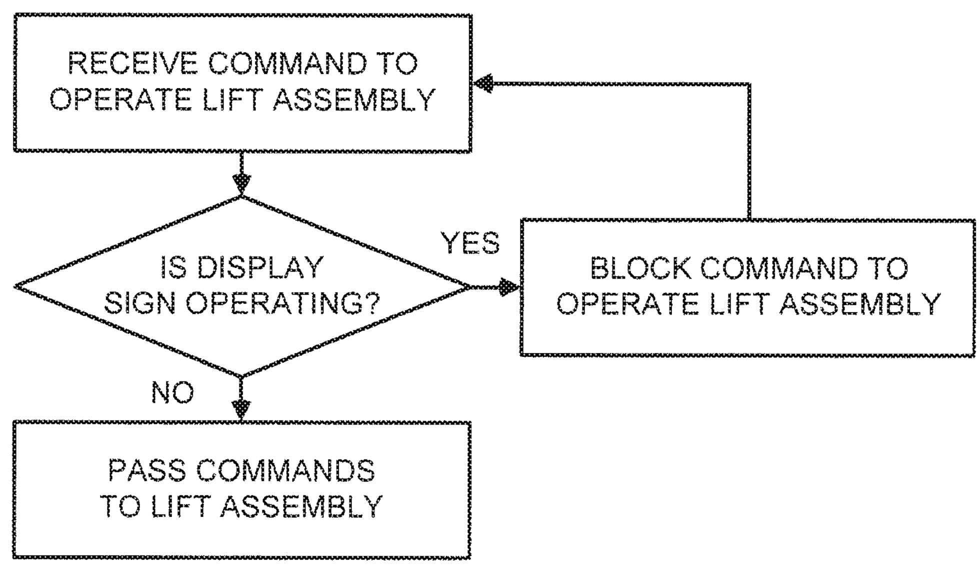
FIG. 11 is a schematic flow diagram of some optional aspects of the operation of the apparatus, according to an illustrative embodiment.
Figure 12:
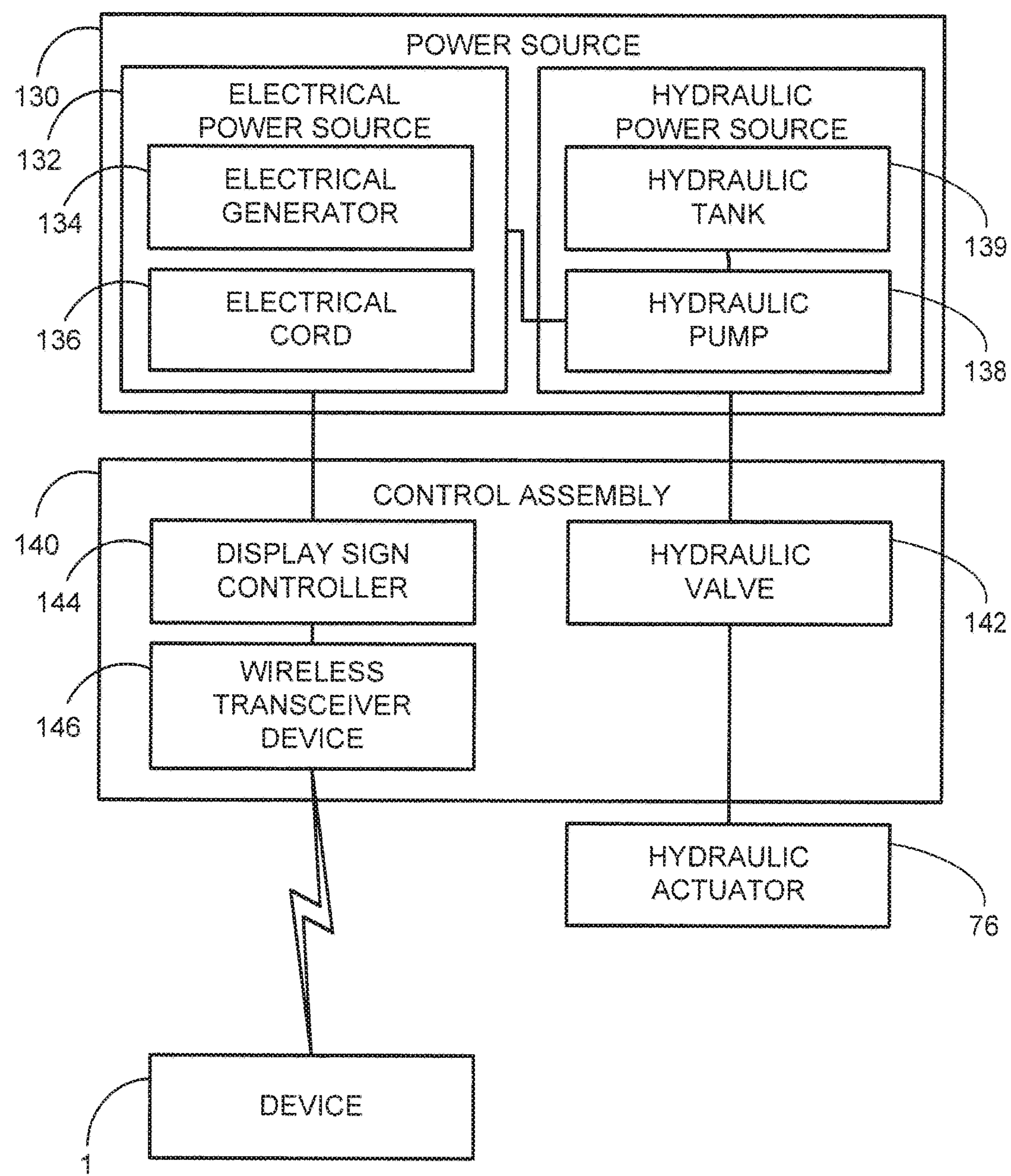
FIG. 12 is a schematic diagram of various power and control elements of the apparatus, according to an illustrative embodiment.
Figure 13:
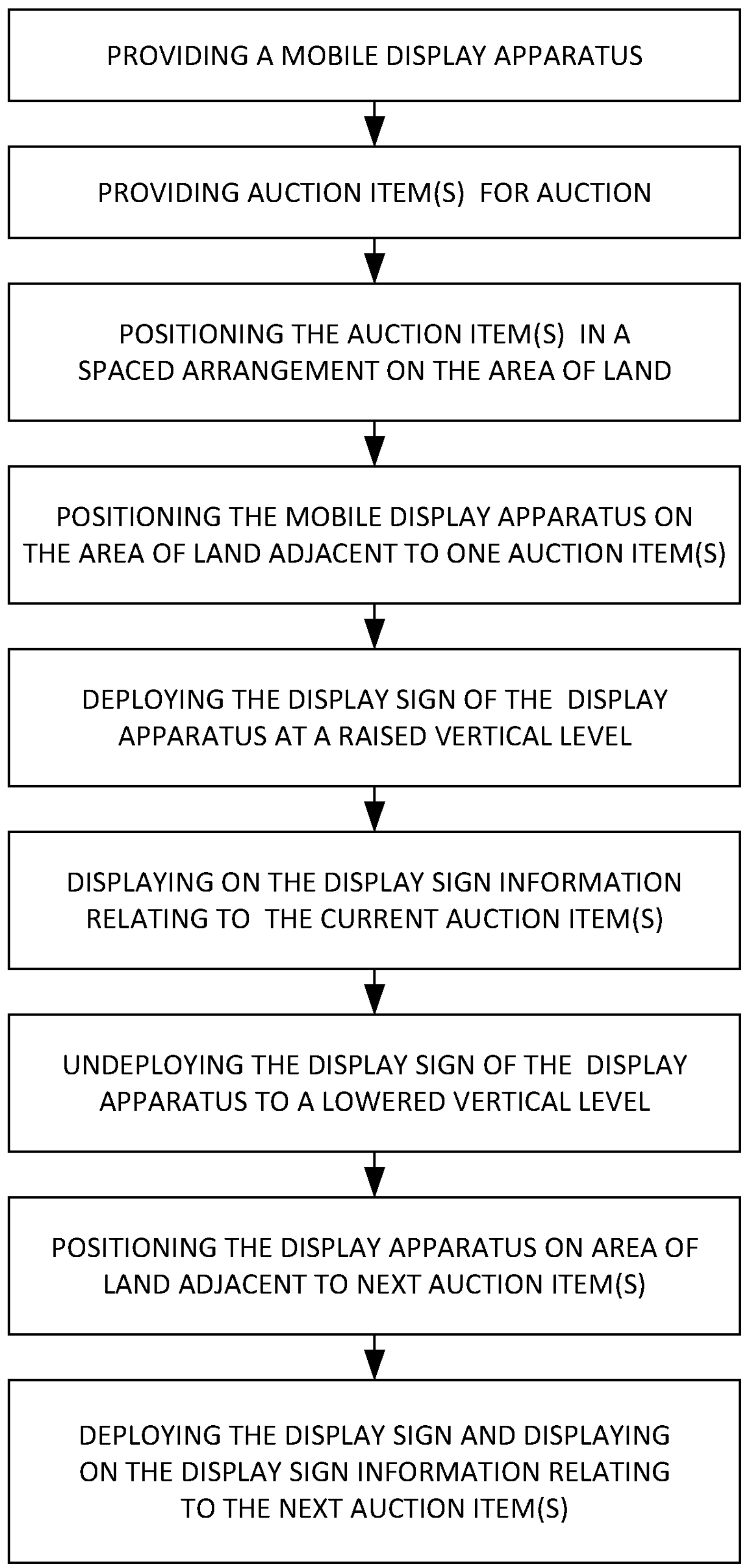
FIG. 13 is a schematic flow diagram of a method for utilizing a mobile display apparatus, according to an illustrative implementation of the disclosure.

In some embodiments, the structure for retaining the retainer bracket on the pin, such as shown in FIG. 10, includes a retaining clip 128 removable positionable in a groove 129 formed on the end portion 108 to block removal of the retainer from the end portion of the pin when the clip 128 is in position.

The apparatus 10 may also include a power source 130 which is positioned on the mobile base 12. The power source 130 may include an electrical power source 132 which is configured to provide electrical power to the display sign 82. In some embodiments, the electrical power source 132 may comprise an electrical generator 134 mounted on the mobile base and which may be positioned in one of the compartments formed by the body 38 of the mobile base. In some embodiments, in addition to or as an alternative to the electrical generator 34, the electrical power source may include an electrical power cord 136 with an electrical plug which is configured to be plugged into an electrical outlet to provide power from the electrical utility power grid. The power source 130 may also include a hydraulic pump 138 which is configured to pressurize a quantity of hydraulic fluid drawn from a hydraulic tank 139. The hydraulic pump may be operated by electrical power provided by the electrical power source. The hydraulic pump 138 may be in communication with the lift actuator 76 of the lift assembly to operate the actuator.

The apparatus 10 may also include a control assembly 140 which is mounted on the mobile base 12. The control assembly 140 may include a hydraulic valve 142 which is configured to control the flow of pressurized hydraulic fluid from the hydraulic pump 138 to the lift actuator 76. The hydraulic valve 142 may be configured to direct hydraulic fluid to the lift actuator in a manner permitting extension or retraction of the lift actuator. The control assembly 140 may also include a display sign controller 144 mounted on the mobile base and suitable for controlling display of images on the illuminated changeable display of the display sign. The display sign controller 144 may include a wireless transceiver device 146 which is configured to transmit and receive signals from a device 1, such as a smartphone via a software program or app enabling the transmission and reception of signals via a suitable wireless proponent protocol, such as Wi-Fi, Bluetooth or near field communication (NFC). In some implementations, the wireless device 1 may comprise a dedicated control device rather than a general purpose communication device such as a smart phone. Such wireless transmissions and communications may be employed to not only control the physical movement of elements of the apparatus 10, but also to control the information being displayed on the display faces 84, 85 of the display sign 82 during operation of the sign. For example, images displayed on the display faces may be caused to change from one image to another image by a command transmitted wirelessly from the wireless device 1 to the wireless transceiver device 146 of the apparatus. Further, a display mode for the display sign may also be wirelessly control, such as changing the display of information or images from a static (or unchanging) mode to a dynamic (or changing) mode in which a series of images are displayed in succession in a rotating manner.

In operation, some embodiments of the apparatus 10 may be configured so that the control assembly 140 may be configured to prevent operation of the lift assembly, and more specifically of the lift actuator, if the display sign is receiving electrical power to display images. The control assembly may be configured to prevent the supply of electrical power to the hydraulic pump permitting operation of the lift actuator if it is determined that electrical power is being supplied to the display sign for displaying images.

Other aspects of the disclosure relate to the utilization of an apparatus of the type disclosed herein and having one or more elements set forth in this disclosure. As an example, a method of communicating information over an area of land 2 (see FIG. 13) may utilize a mobile display apparatus 150 having various features and elements of the apparatus 10 described herein. Illustratively, such a method may be used to communicate information in the context of conducting a sale or auction on an area of land 2 with the mobile display apparatus 150 which will be further described.

The illustrative method may include providing the mobile display apparatus 150 which has various features and elements of the apparatus set forth in this disclosure. Illustratively, the apparatus 150 may include a mobile base which may comprise, for example, a vehicle (such as a vehicle having a cargo bed) or a trailer which is towable by a vehicle. The mobility of the base permits movement of the apparatus about the area of land, which can be particularly useful where auction items or groupings of auction items are distributed about the area of land 2. The apparatus 150 may also include a lift assembly and a display sign which is mounted on the mobile base via the lift assembly.

The method may also include providing at least one item 152, or auction item, to be auctioned off. In some implementations of the method, the auction item may be real property (e.g., a plot of land, a building) while in other implementations the auction item 2 may be a tangible object. Optionally, a plurality of auction items may be up for auction, including a plurality of tangible objects. The objects of the multiple auction items may be distributed over the surface of the area of land where the auction is being conducted, with the locations of the auction items (or groupings of auction items) being dispersed or separated from each other about the area of land (see FIGS. 14 through 16), which is a common manner of displaying auction items for inspection by prospective buyers and subsequently selling the items by auction. The act of auctioning auction items distributed over an area of land typically requires movement of the auctioneer and his or her equipment from the location of one auction item (or grouping of auction items), to the location of the next auction item (or grouping of auction items) as a series of individual "auctions" or bidding events are conducted for each of the items or groupings of items.

Figure 14:
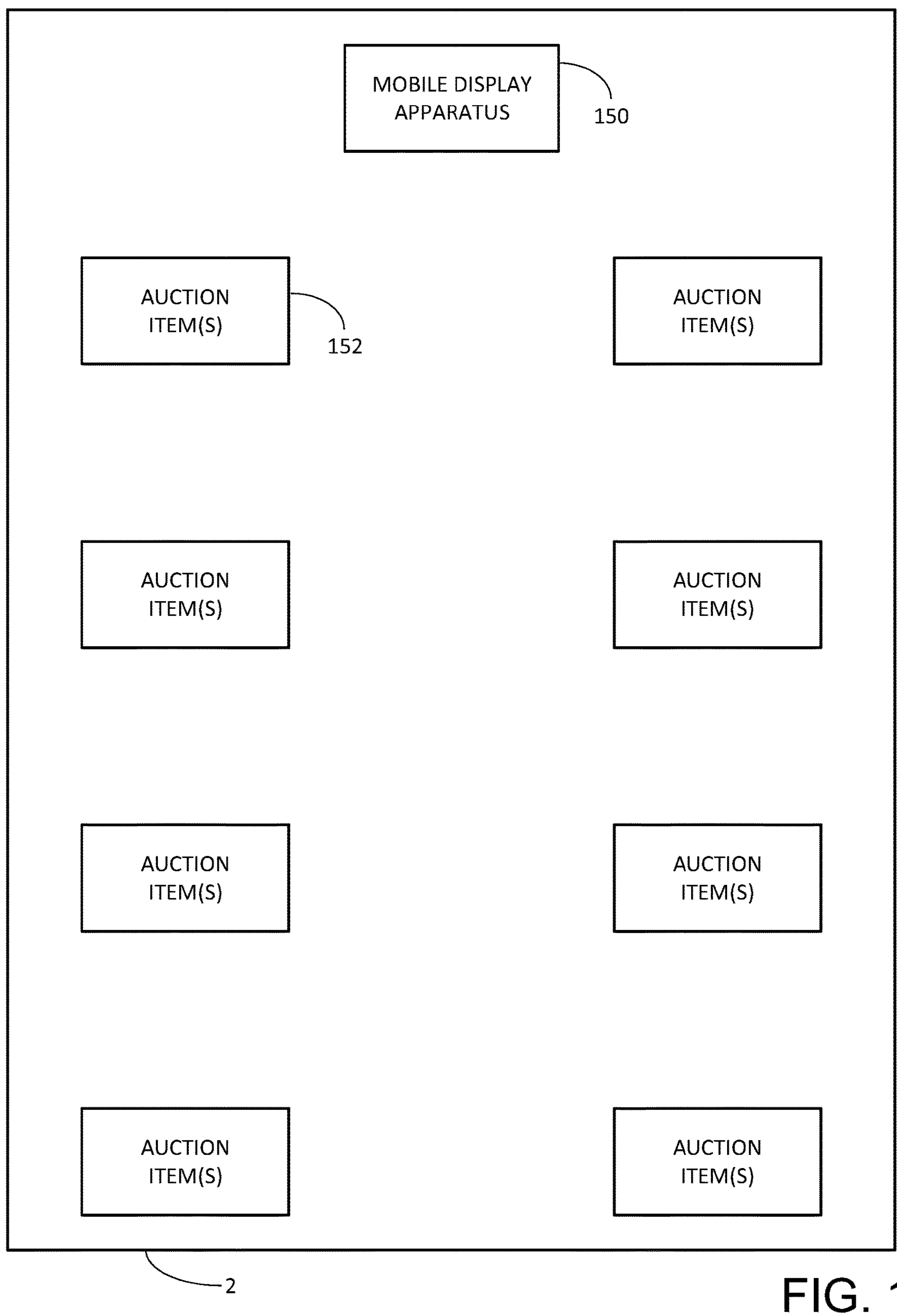
FIG. 14 is a schematic diagram of exemplary locations of a mobile display apparatus and a plurality of auction items on an area of land, according to an illustrative implementation of the disclosure.
Figure 15:
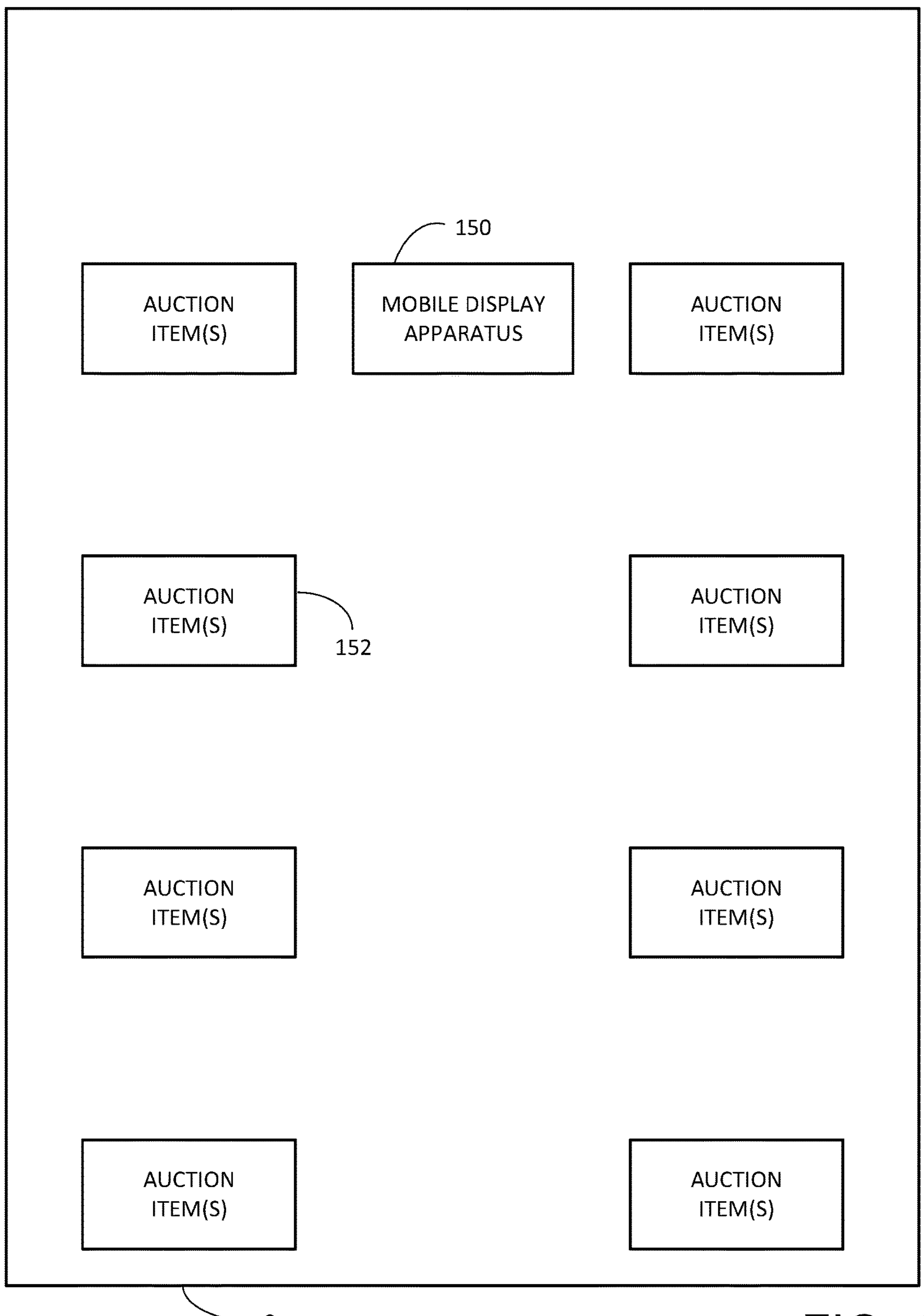
FIG. 15 is a schematic diagram of additional exemplary locations of the mobile display apparatus and the plurality of auction items on an area of land, according to an illustrative implementation of the disclosure.

The method may further include positioning the mobile display apparatus on the area of land, such as at a location which is adjacent to the location of one of the auction items (such as is illustrated in FIG. 14 to FIG. 15). The positioning of the mobile display apparatus may include repositioning the apparatus from an initial location (see FIG. 14) to the location (see FIG. 15) adjacent to the auction item(s). Moving the display apparatus between locations may include driving a vehicle which forms the mobile base between the locations, or driving a vehicle which tows the trailer which forms the mobile base of the display apparatus between locations. Optionally, the mobile display apparatus 150 may be maintained in a single location (e.g., see FIG. 14) which may be viewable from many or all locations of the auction items on the area of land with the content of the information displayed changing as the item currently under auction changes during the course of the auction event. Changing of the content of the display may be initiated wirelessly and remotely by the auctioneer as he or she moves between the locations of the auction items.

Figure 2:
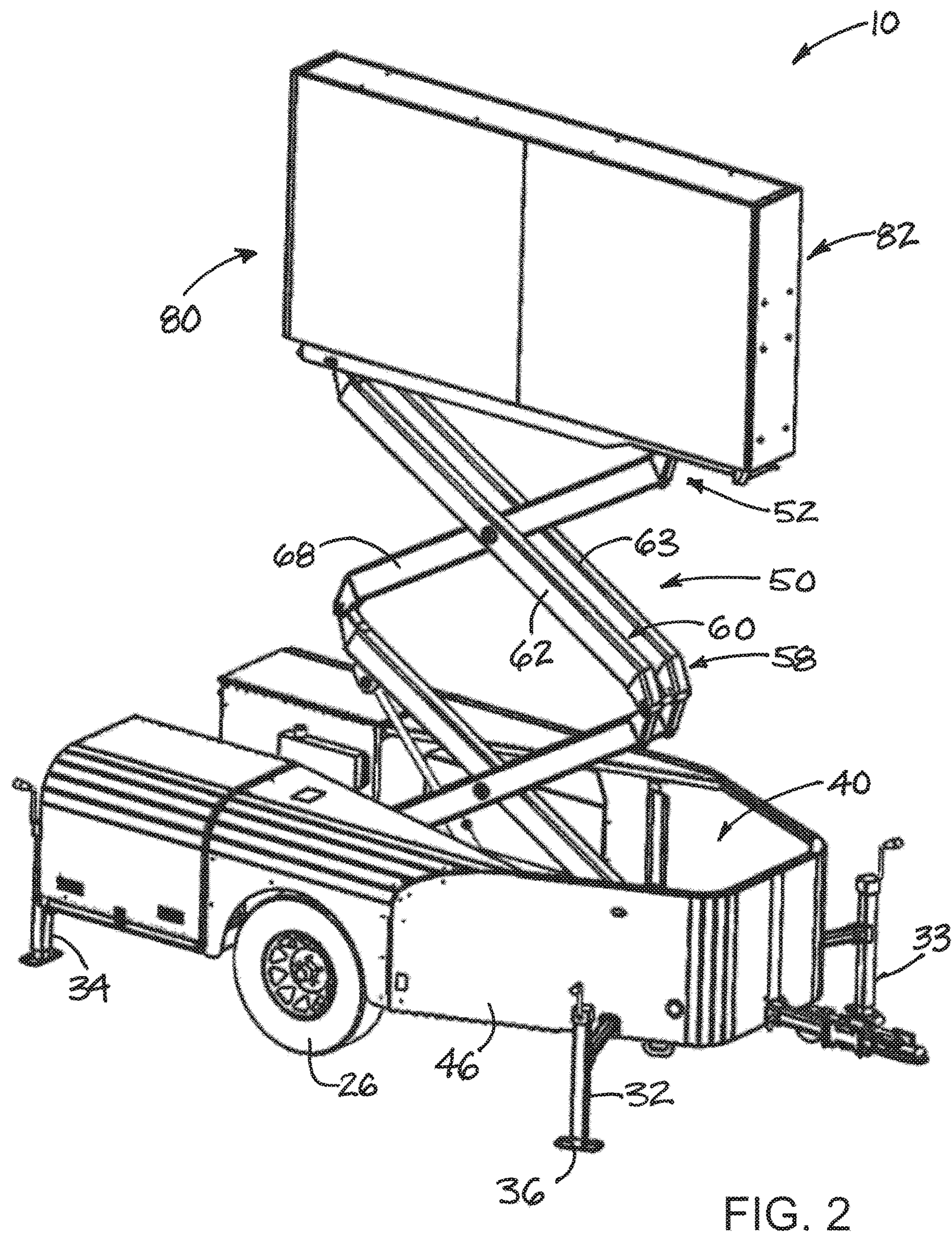
FIG. 2 is a schematic perspective side view of the mobile elevating apparatus with the lift assembly in the extended position, according to an illustrative embodiment.
Figure 3:
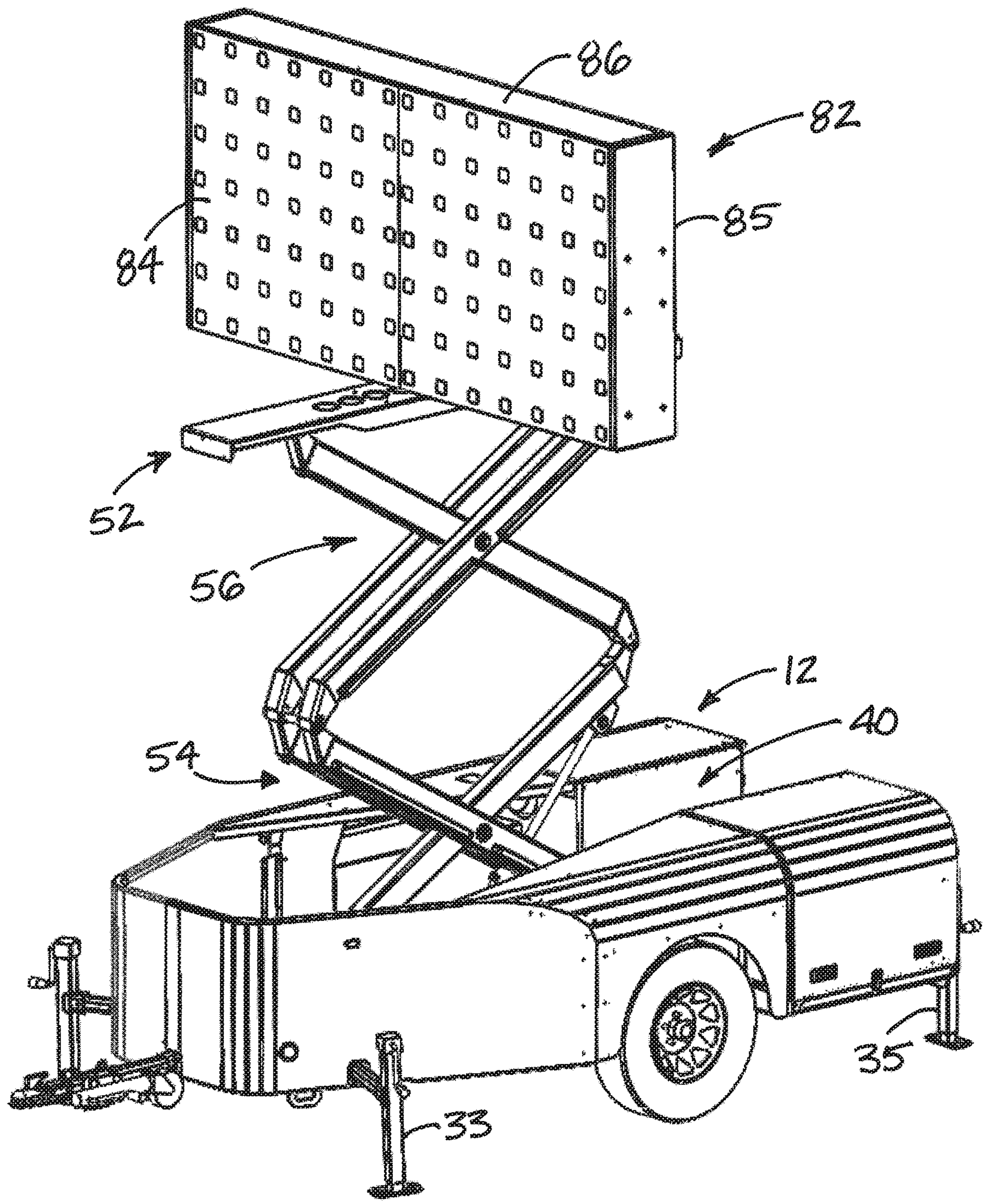
FIG. 3 is a schematic perspective side view of the mobile elevating apparatus with the lift assembly in the extended position and the display sign rotated, according to an illustrative embodiment.
Figure 4:
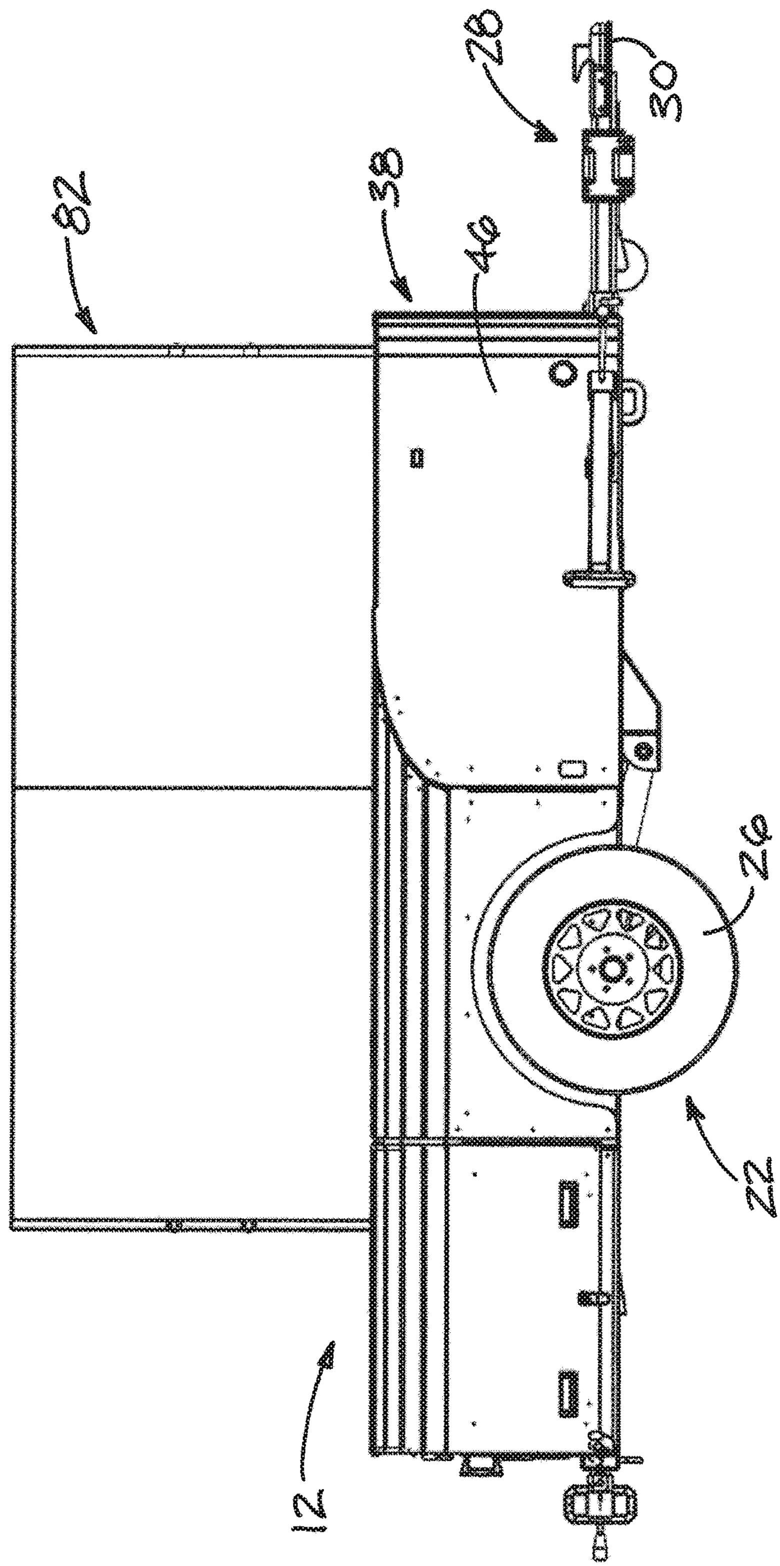
FIG. 4 is a schematic side view of the mobile elevating apparatus showing the lift assembly in the retracted position, according to an illustrative embodiment.
Figure 5:
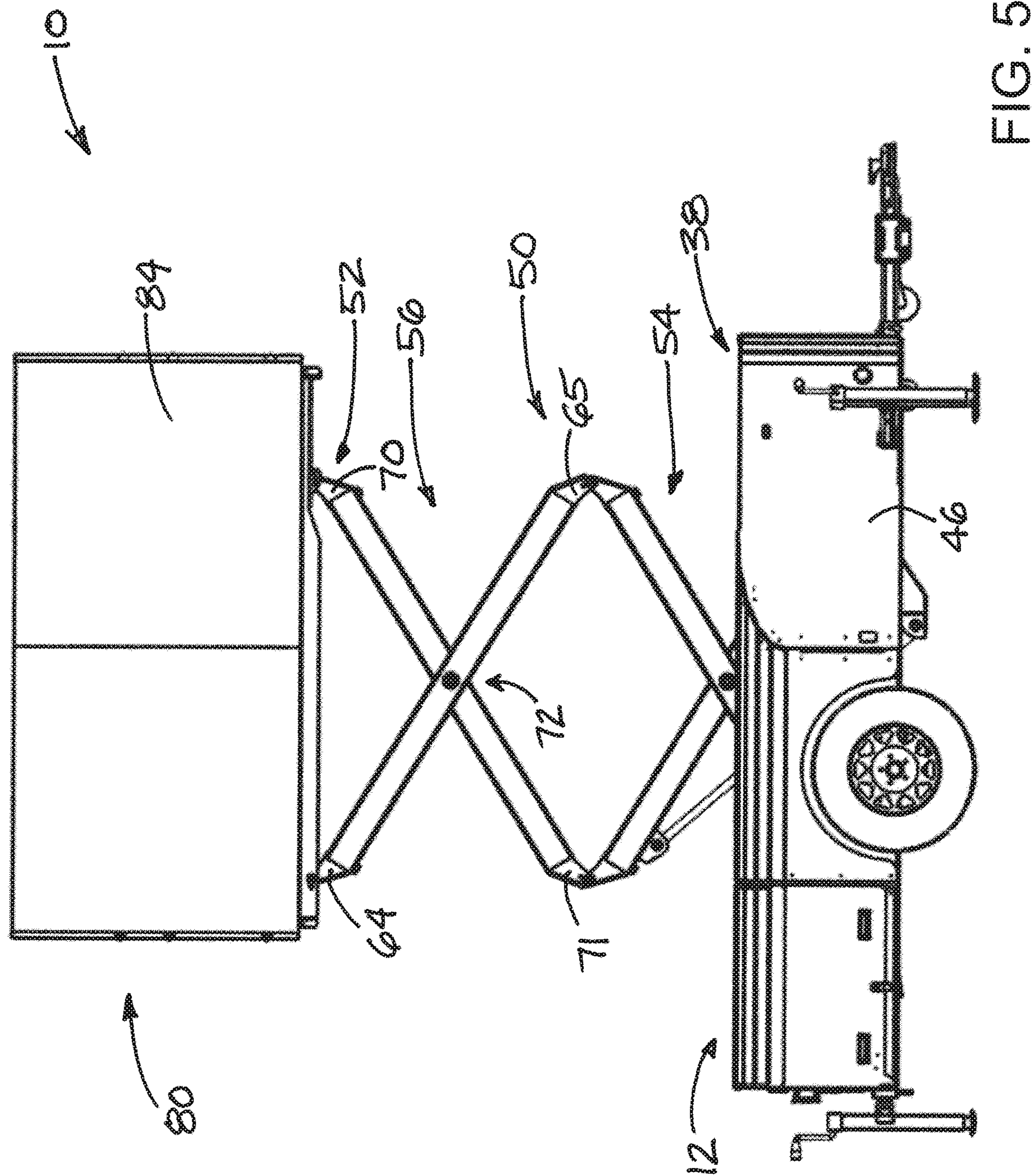
FIG. 5 is a schematic side view of the mobile elevating apparatus showing the lift assembly in the extended position, according to an illustrative embodiment.
Figure 6:
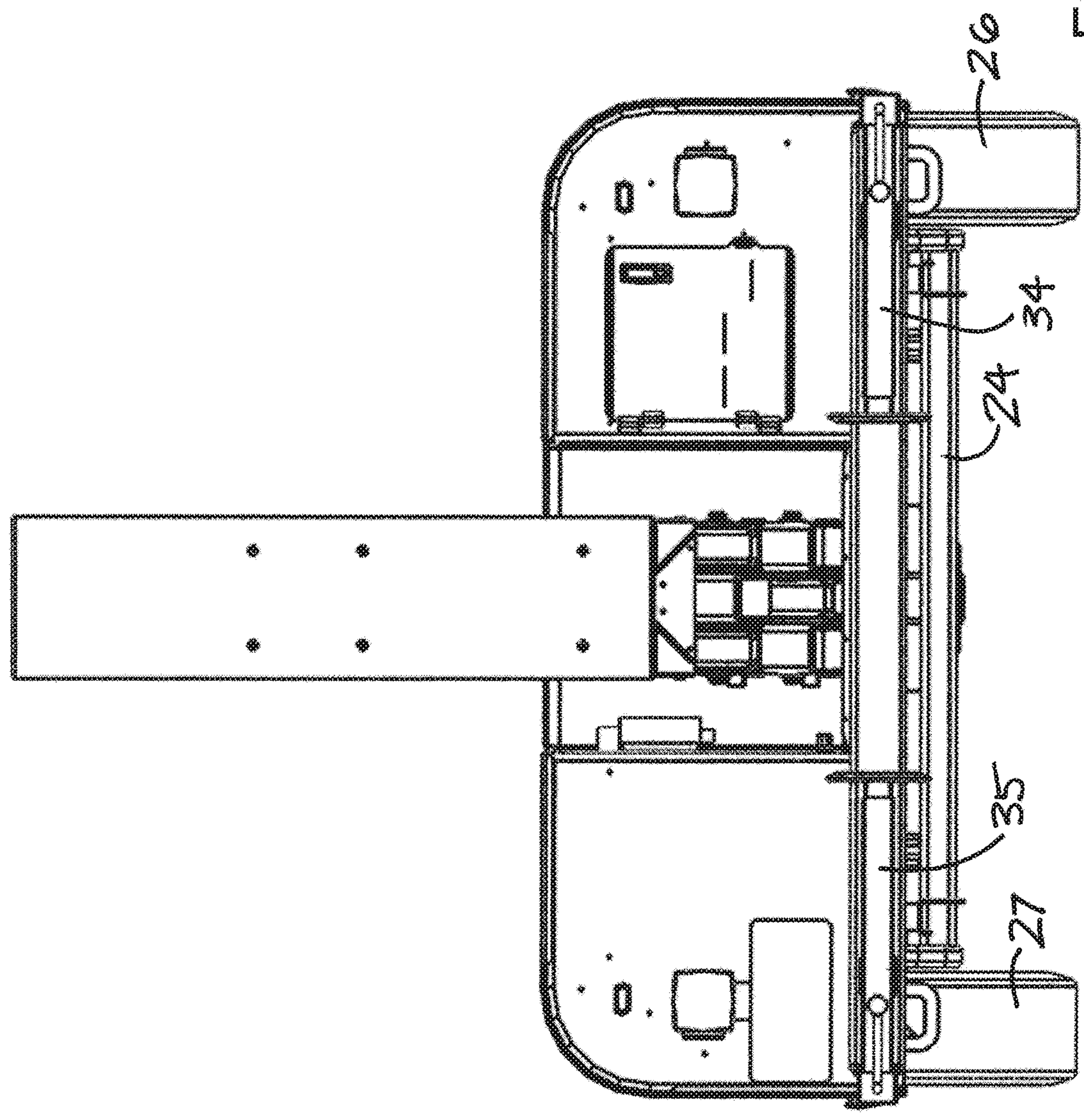
FIG. 6 is a schematic rear view of the mobile elevating apparatus showing the lift assembly in the retracted position, according to an illustrative embodiment.
Figure 7:
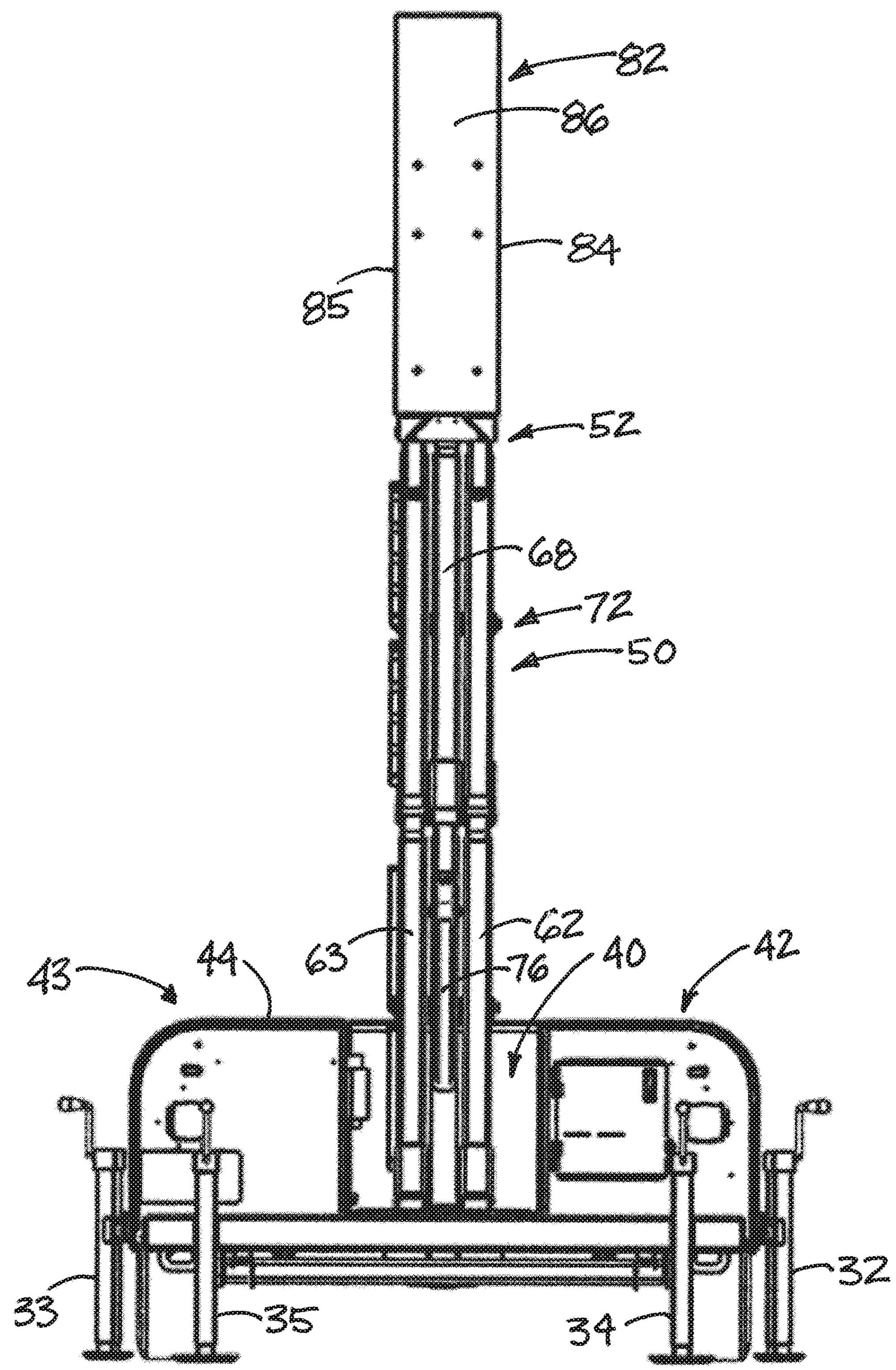
FIG. 7 is a schematic rear view of the mobile elevating apparatus showing the lift assembly in the extended position, according to an illustrative embodiment.
Figure 8:
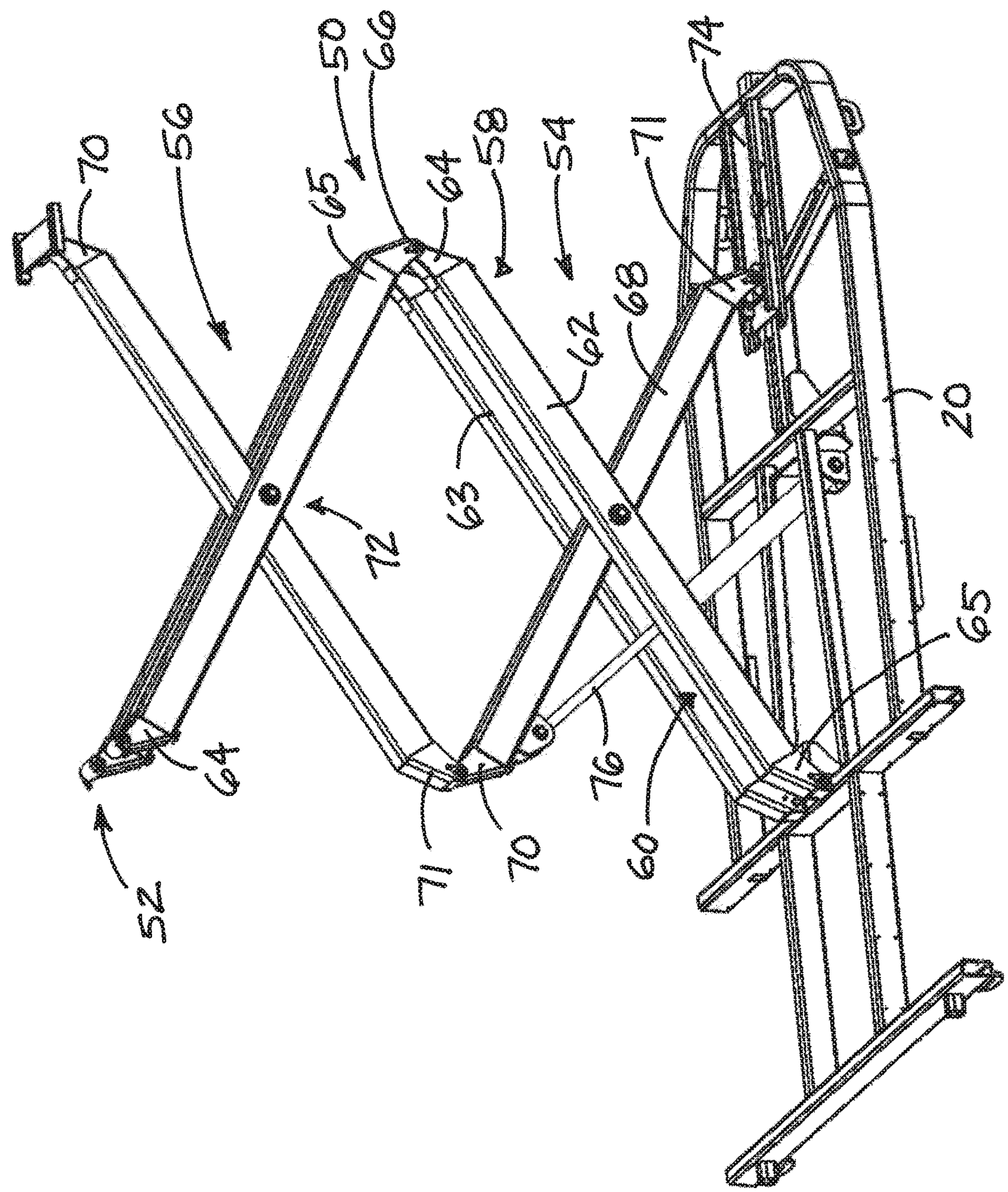
FIG. 8 is a schematic perspective view of the frame and lift assembly in the extended positon, according to an illustrative embodiment.

Additional aspects of the method may include deploying the mobile display apparatus so that the visibility of the display face or faces of the display sign is enhanced or increased over a greater portion of the area of land (see, e.g., FIGS. 1 and 2). Enhanced visibility of the display faces may be provided by raising the vertical level or height of the display sign with respect to the land surface by operating the lift assembly of the apparatus 150 (see, e.g., FIG. 1 to FIG. 2). Deployment of the mobile display apparatus may include raising the display sign to a fully raised height, or an intermediate height between the fully lowered or retracted position and the fully raised or extended position.

The method may also include displaying on the mobile display apparatus information related to a particular auction item, or a particular grouping of auction items, such as the auction item or items located adjacent to the location of the apparatus when the information is being displayed. Illustratively, the displayed information may include identification of the item currently being auctioned off, which may include text about and/or images of the auction item(s), and information that includes amounts associated with the auction item, such as a current bid amount, a minimum bid amount or reserve amount associated with the auction item, and/or the amount of the winning bid. Information regarding identification of the current high bidder or the winning bidder may also be displayed. Further, information may be displayed on the display sign regarding upcoming auction items such as the next item to be auctioned after the current item is auctioned.

Additionally, the method may include the step of undeploying the mobile display apparatus, which may occur after the auction of the particular auction item or grouping of items located at the location has been concluded. The undeploying of the mobile apparatus may include lowering the vertical level or height of the display sign with respect to the land surface by operating the lift assembly of the apparatus, and may put the apparatus 150 in condition for movement to a different location (see, e.g., FIG. 2 to FIG. 1). Optionally, the display sign may be maintained in the raised position during and between the auctioning of each auction item(s), and in such cases the display sign may be maintained at a partially raised height which permits safe movement of the apparatus over short distances on the area of land. Such an intermediate height may provide greater visibility for the information displayed on the sign, while maintaining the apparatus in a stable condition as it is moved.

Figure 16:
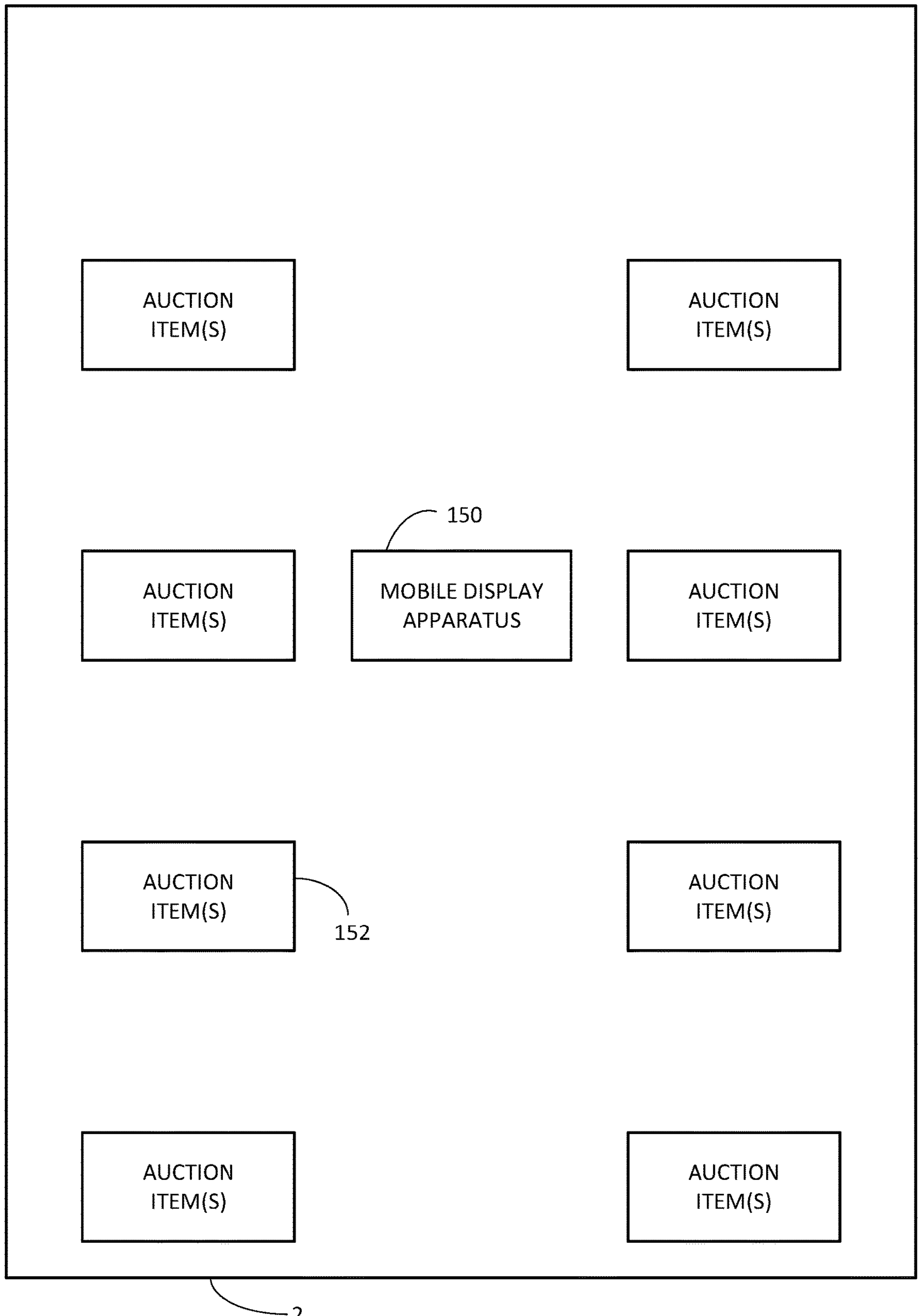
FIG. 16 is a schematic diagram of further additional exemplary locations of the mobile display apparatus and the plurality of auction items on an area of land, according to an illustrative implementation of the disclosure.

The method may further include repositioning to the location of another one of the auction item(s) which may include moving the mobile display apparatus 150 over the area of land from the location of the most recently auctioned item(s) (see FIG. 15) to location of the next item to be auctioned (see FIG. 16). At the new location adjacent to the another auction item, the display apparatus may be deployed, or re-deployed, by again raising the vertical level or height of the display sign with respect to the land surface by operating the lift assembly of the apparatus 150. The step of displaying information related to the next auction item(s) on the mobile display apparatus may also be taken. Some or all of these steps may be repeated for each auction item(s) at the auction site.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that steps set forth in the description and/or shown in the drawing figures may be altered in a variety of ways. For example, the order of the steps may be rearranged, substeps may be performed in parallel, shown steps may be omitted, or other steps may be included, etc.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A method of communicating information over an area of land with a mobile display apparatus, the method comprising:

providing a mobile display apparatus including a mobile base and a display sign mounted on the mobile base;

providing at least one item at a location on the area of land;

positioning the mobile display apparatus on the area of land adjacent to the location of the at least one item;

deploying the mobile display apparatus;

displaying on the mobile display apparatus information related to the at least one item;

moving the mobile display apparatus over the area of land to a location on the area of land adjacent to a location of another said at least one item; and displaying on the mobile display apparatus information related to the another at least one item;

wherein the step of deploying the display apparatus includes raising the display sign of the mobile display apparatus to a raised position relative to the mobile base of the mobile display apparatus; and additionally comprising maintaining the display sign in at least a partially raised position while moving the mobile display apparatus over the area of land;

wherein the mobile base of the mobile display apparatus includes a frame; and wherein the mobile display apparatus further includes:

a lift assembly mounted on the frame and having the display sign mounted thereon, the lift assembly being extendable and retractable with respect to the frame to raise and lower the display sign with respect to the mobile base;

a power source positioned on the mobile base; and a control assembly mounted on the mobile base;

wherein the display sign has opposite display faces with at least one of the display faces including an illuminated changeable display; and wherein the display faces of the display sign face laterally with respect to the mobile base, the display sign being rotatable about a substantially vertical axis with respect to the lift assembly such that the display faces face forward and rearward with respect to the mobile base.

2. A method of communicating information over an area of land with a mobile display apparatus, the method comprising:

providing a mobile display apparatus including a mobile base;

providing the mobile display apparatus with a display sign with opposite display faces, each of the opposite display faces having an illuminated changeable display capable of displaying changeable characters and graphics, the display sign being mounted on the mobile base;

providing at least one item at a location on the area of land;

positioning the mobile display apparatus on the area of land adjacent to the location of the at least one item;

deploying the mobile display apparatus;

displaying on the mobile display apparatus information characterizing the at least one item on at least one of the display faces of the display sign;

moving the mobile display apparatus over the area of land to a location on the area of land adjacent to a location of another said at least one item; and displaying on the mobile display apparatus information characterizing the another at least one item on at least one of the display faces of the display sign;

wherein the step of deploying the display apparatus includes raising the display sign of the mobile display apparatus to a raised position relative to the mobile base of the mobile display apparatus;

additionally comprising maintaining the display sign in the raised position while moving the mobile display apparatus over the area of land; and wherein the display sign has opposite display faces with at least one of the display faces including an illuminated changeable display.

3. The method of claim 2 wherein the mobile base of the mobile display apparatus includes a frame; and wherein the mobile display apparatus further includes:

a lift assembly mounted on the frame and having the display sign mounted thereon, the lift assembly being extendable and retractable with respect to the frame to raise and lower the display sign with respect to the mobile base;

a power source positioned on the mobile base; and a control assembly mounted on the mobile base.

4. The method of claim 2 wherein the display sign has opposite display faces with at least one of the display faces including an illuminated changeable display.

5. The method of claim 2 additionally including undeploying the mobile display apparatus after deploying the mobile display apparatus.

6. The method of claim 5 wherein the step of undeploying the mobile display apparatus includes lowering the display sign of the mobile display apparatus relative to the mobile base of the mobile display apparatus.

7. The method of claim 2 wherein displaying information related to the another item includes changing the information displayed on the mobile display apparatus.

8. The method of claim 2 wherein the step of deploying the display apparatus includes including raising the display sign of the mobile display apparatus relative to the mobile base of the mobile display apparatus.

9. The method of claim 2 wherein the information characterizing the at least one item being displayed on the mobile display apparatus includes an identification of the at least one item.

10. The method of claim 2 wherein the information characterizing the at least one item being displayed on the mobile display apparatus includes an amount associated with the at least one item.

11. The method of claim 10 wherein the amount displayed on the mobile display apparatus includes a current bid amount.

12. The method of claim 2 wherein the information characterizing the at least one item comprises text characters describing the at least one item.

13. A method of communicating information over an area of land with a mobile display apparatus, the method comprising:

providing a mobile display apparatus including a mobile base and a display sign mounted on the mobile base, the mobile base having a longitudinal axis oriented parallel to a forward direction of movement of the mobile display apparatus, the display sign having opposite display faces;

providing at least one item at a location on the area of land;

positioning the mobile display apparatus on the area of land adjacent to the location of the at least one item;

deploying the mobile display apparatus by:

raising the display sign to a raised position relative to the mobile base; and rotating the display sign about a vertical axis from a first orientation to a second orientation of the display sign, the first orientation being characterized by the display faces being oriented parallel to the longitudinal axis of the mobile base such that the display faces face laterally outwardly with respect to the longitudinal direction of the mobile display apparatus, the second orientation being characterized by the display faces being oriented perpendicular to the longitudinal axis of the mobile base such that the display faces face forwardly and rearwardly with respect to the mobile base;

displaying on the mobile display apparatus information related to the at least one item;

moving the mobile display apparatus over the area of land to a location on the area of land adjacent to a location of another said at least one item while maintaining the display sign in the raised position; and displaying on the mobile display apparatus information related to the another at least one item;

and undeploying the mobile display apparatus by:

rotating the display sign about the vertical axis from the second orientation to the first orientation of the display sign; and lowering the display sign in the first orientation to a lowered position relative to the mobile base;

wherein the mobile display apparatus further includes:

a frame of the mobile base;

a lift assembly mounted on the frame and having the display sign mounted thereon, the lift assembly being extendable and retractable with respect to the frame to raise and lower the display sign with respect to the mobile base between the raised and lowered positions of the display sign;

a power source positioned on the mobile base; and a control assembly mounted on the mobile base;

wherein the display sign has opposite display faces with at least one of the display faces including an illuminated changeable display.

14. The method of claim 13 additionally including undeploying the mobile display apparatus after deploying the mobile display apparatus.

15. The method of claim 14 wherein the step of undeploying the mobile display apparatus includes lowering the display sign of the mobile display apparatus relative to the mobile base of the mobile display apparatus.

16. The method of claim 13 wherein displaying information related to the another item includes changing the information displayed on the mobile display apparatus.

17. The method of claim 13 wherein the step of deploying the display apparatus includes including raising the display sign of the mobile display apparatus relative to the mobile base of the mobile display apparatus.

18. The method of claim 13 wherein the information displayed on the mobile display apparatus includes an identification of the at least one item.

19. The method of claim 18 wherein the information displayed on the mobile display apparatus includes an identification of a winning bidder for the at least one item.

20. The method of claim 13 wherein the information displayed on the mobile display apparatus includes an amount associated with the at least one item.

21. The method of claim 20 wherein the amount displayed on the mobile display apparatus includes a current bid amount.

22. The method of claim 20 wherein the amount displayed on the mobile display apparatus includes an amount of the winning bid.

* * * * *